United States Patent
Wall

(10) Patent No.: US 6,533,881 B1
(45) Date of Patent: Mar. 18, 2003

(54) COMPOSITE METAL AND PLASTIC FENCING AND METHOD THEREFOR

(76) Inventor: John Ronan Wall, 440 W. Greene St., Carmichaels, PA (US) 15320

( * ) Notice: Subject to any disclaimer, the term of this patent is extended or adjusted under 35 U.S.C. 154(b) by 0 days.

(21) Appl. No.: 09/432,613

(22) Filed: Nov. 3, 1999

Related U.S. Application Data

(60) Provisional application No. 60/140,017, filed on Jun. 18, 1999.

(51) Int. Cl.$^7$ .......................... B32B 31/30; B29C 47/02
(52) U.S. Cl. .................... 156/160; 156/244.12; 256/10; 264/261
(58) Field of Search .............................. 256/52, 49, 47, 256/54, 19, 1, 13.1, 10, 46; 156/244.12, 244.22, 244.23, 160, 161; 264/261, 265, 288.4

(56) References Cited

U.S. PATENT DOCUMENTS

| | | | | |
|---|---|---|---|---|
| 3,532,783 A | * | 10/1970 | Pusey et al. ................. | 264/135 |
| 3,722,861 A | * | 3/1973 | Anderson .................... | 254/64 |
| 3,795,540 A | * | 3/1974 | Mildner ...................... | 117/226 |
| 3,893,642 A | * | 7/1975 | Van Vlaenderen ............. | 245/2 |
| 3,980,277 A | * | 9/1976 | Enoksson .................... | 256/10 |
| 4,111,400 A | * | 9/1978 | Enoksson .................... | 256/47 |
| 4,182,382 A | * | 1/1980 | Ingraham .................... | 140/3 R |
| 4,465,263 A | * | 8/1984 | Robbins, Jr. ................. | 256/52 |
| 4,533,120 A | * | 8/1985 | Ruddock ..................... | 256/52 |
| 4,684,107 A | * | 8/1987 | Robbins, Jr. ................. | 256/19 |
| RE32,707 E | * | 7/1988 | Robbins, Jr. ................. | 256/52 |
| 4,860,996 A | * | 8/1989 | Robbins, III ................. | 256/10 |
| 4,881,721 A | * | 11/1989 | Manley ....................... | 256/52 |
| 5,096,162 A | * | 3/1992 | Cleveland .................... | 256/10 |
| 5,163,658 A | * | 11/1992 | Cleveland .................... | 256/10 |
| 5,203,542 A | * | 4/1993 | Coley et al. .................. | 256/10 |
| 5,275,270 A | * | 1/1994 | Dobó ......................... | 198/337 |
| 5,932,149 A | * | 8/1999 | Schneider ................... | 264/1.29 |

* cited by examiner

*Primary Examiner*—Anthony Knight
*Assistant Examiner*—Doug Hutton
(74) *Attorney, Agent, or Firm*—Webb Ziesenheim Logsdon Orkin & Hanson, P.C.

(57) ABSTRACT

Composite metal and plastic fencing includes a plurality of spaced apart fence posts and at least one fence rail member vertically supported on the fence posts and extending between the fence posts. The at least one fence rail member further includes at least one longitudinally extending fence wire, an adhesive layer adhered to the at least one fence wire and a layer of synthetic resin material adhered to the at least one fence wire by the adhesive layer. The layer of synthetic resin material encloses the at least one fence wire and may form at least one web extending between a plurality of spaced apart fence wires.

4 Claims, 3 Drawing Sheets

COMPOSITE METAL AND PLASTIC FENCING AND METHOD THEREFOR

CROSS REFERENCE TO RELATED APPLICATION

This application claims the benefit of U.S. Provisional Application Ser. No. 60/140,017, filed Jun. 18, 1999 and entitled "Composite Metal and Plastic Fencing and Method Therefor".

BACKGROUND OF THE INVENTION

1. Field of the Invention

The present invention relates to composite metal and plastic fencing and, more particularly, to composite metal wire and plastic fence rail members.

2. Description of the Prior Art

Composite metal and plastic fencing is well-known in the art. Composite metal and plastic fencing is known as an inexpensive and safe alternative to other commonly employed materials used in the construction of fences such as wood and barbed wire. Wood suffers from the disadvantages that it is expensive to install and maintain and, further, that it has a tendency to weather and rot over time. Barbed wire fencing is a relatively low cost means for enclosing livestock areas. However, barbed wire fencing suffers from the disadvantage that its sharp barbs may cut or gouge the hide of valuable livestock animals such as horses.

One example of composite metal and plastic fencing found in the prior art is disclosed by U.S. Pat. No. 4,465,263 to Robbins, Jr. (hereinafter "the Robbins '263 patent"). The Robbins '263 patent discloses a composite metal and plastic fence that includes at least two high tensile strength metal wires that are ensheathed in a plastic casing and affixed to posts or poles with clamps. In the Robbins '263 patent, the two metal wires are spaced a distance apart and the plastic that encloses the wires also forms a web area extending between the wires.

U.S. Pat. No. 4,684,107 to Robbins, Jr. (hereinafter "the Robbins '107 patent") discloses a composite metal and plastic fence which improves on the composite metal and plastic fence disclosed by the Robbins '263 patent. The Robbins '107 patent discloses a composite metal wire and plastic fence that is intended to improve the adhesion between the wires and the plastic covering layer. This is accomplished by roughening the exterior of the wires before the wires are ensheathed with extruded plastic.

U.S. Pat. No. 4,533,120 to Ruddock discloses fencing rail members in the form of a composite member which may be used as a substitute for wooden rails in fencing. The Ruddock patent discloses a composite member that includes a plurality of wire members that are spaced apart and coated by a synthetic resin material forming a web between the wires. Longitudinal ribs are formed on the webs to facilitate coiling of the fence rail members for storage or transit and to enhance the appearance of the fence rail members.

The above-discussed prior art suffers the disadvantage that when two adjacent coils of fencing are joined together by mechanically fastening the wires (such as with crimping sleeves), the plastic outer layer has a tendency to separate or pull apart from the underlying wires when the wires are tensioned. As a result, the wires may become exposed to potentially injure livestock. In addition, the exposed wires make the composite fencing unsightly. The above-discussed Robbins '107 patent attempts to overcome this disadvantage by first abrading or roughening the wires to improve the connection between the wires and the surrounding plastic. However, the abrading can cause damage to the protective coating of the wires necessitating a topical coating of paint on the exposed or stripped wires before covering the wires with extruded plastic. The roughening of the exterior of the wires can cause the plastic coating to be prematurely worn, exposing the wire and shortening the useful life of the fencing. The exposed wires and the poor connection between the wires and the surrounding plastic in the above-discussed prior art references permit water to seep into the wires and cause oxidation, which drastically shortens the life span of the fencing.

Additionally, when the plastic outer layer is not well adhered to the underlying wires, the structural reinforcement provided by the wires may be lost and breakage can occur. In particular, breakage will primarily occur around the supporting brackets of the fencing where adjacent coils of fencing are joined and where abrasion can occur from contraction and expansion of the surrounding plastic relative to the underlying wiring, or from livestock rubbing the fencing. Furthermore, because the plastic will shrink a greater amount under cold conditions than will the underlying wires, it is essential that the wires and surrounding plastic be well bonded to one another. Accordingly, the object of the present invention is to overcome the above-discussed deficiencies in prior art composite metal and plastic fencing at minimal additional cost.

SUMMARY OF THE INVENTION

The above-stated object is accomplished with a composite fence assembly and method of making the same which I have invented. The composite fence assembly generally includes a plurality of spaced apart fence posts and at least one fence rail member vertically supported on the fence posts and extending between the fence posts. The at least one fence rail member further includes a plurality of (i.e., at least two) longitudinally extending fence wires, an adhesive layer adhered to each of the fence wires and a layer of synthetic resin material adhered to the fence wires by the adhesive layer. The layer of synthetic resin material encloses the fence wires and may form webs extending between the fence wires such that the fence rail member is formed.

Preferably, the fence wires are galvanized high tensile strength metal fence wires. In addition, the layer of synthetic resin material may be selected from the group consisting of polyvinyl chloride, polyethylene, polypropylene or a combination of polyethylene and polypropylene. The adhesive layer may have a thickness of between 0.001 and 0.030 of an inch on each of the fence wires. The at least one fence rail member may be vertically supported on each of the fence posts with a bracket. The fence wires may be pretensioned.

The present invention also includes a method of forming a composite fence member that includes the steps of providing at least one but generally a plurality of fence wires, straightening the plurality of fence wires, heating the fence wires, supplying or extruding an adhesive layer onto each of the fence wires and extruding a layer of synthetic resin material onto the fence wires. The fence wires are preferably heated to approximately 300° F., and an adhesive layer is preferably added to between 0.001 and 0.030 of an inch in thickness on each of the fence wires. The layer of synthetic resin material may be extruded onto the fence wires such that the layer of synthetic resin material encloses, or encapsulates, the fence wires. The layer of synthetic resin material may form webs extending between the fence wires whereby a fence rail member is formed. The layer of synthetic resin material may be bonded to the fence wires by the adhesive layer surrounding each of the fence wires. The method may also include the step of tensioning the fence wires.

Further details and advantages of the present invention will become apparent in the following detailed description, in conjunction with the drawings, wherein like reference numerals designate like parts throughout.

DETAILED DESCRIPTION OF THE PREFERRED EMBODIMENT

Figure 1:
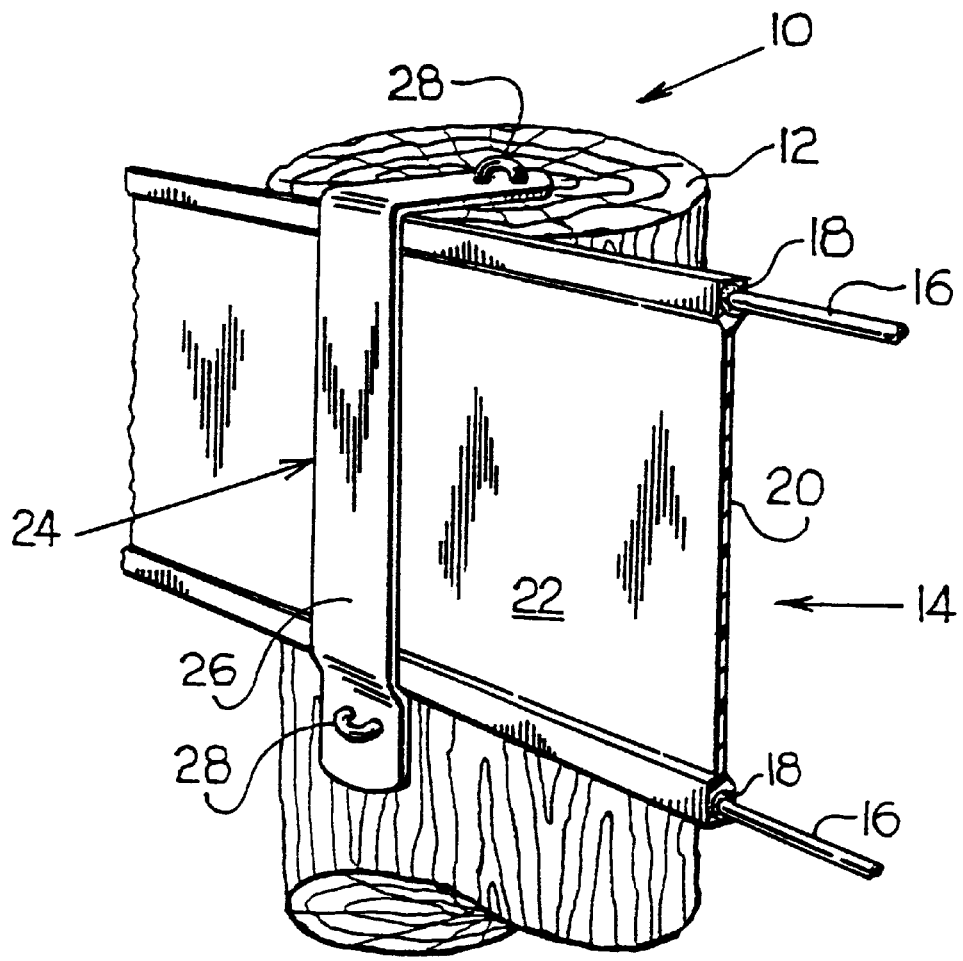
FIG. 1 is a perspective view of the composite metal and plastic fence assembly in accordance with the present invention.
Figure 3:
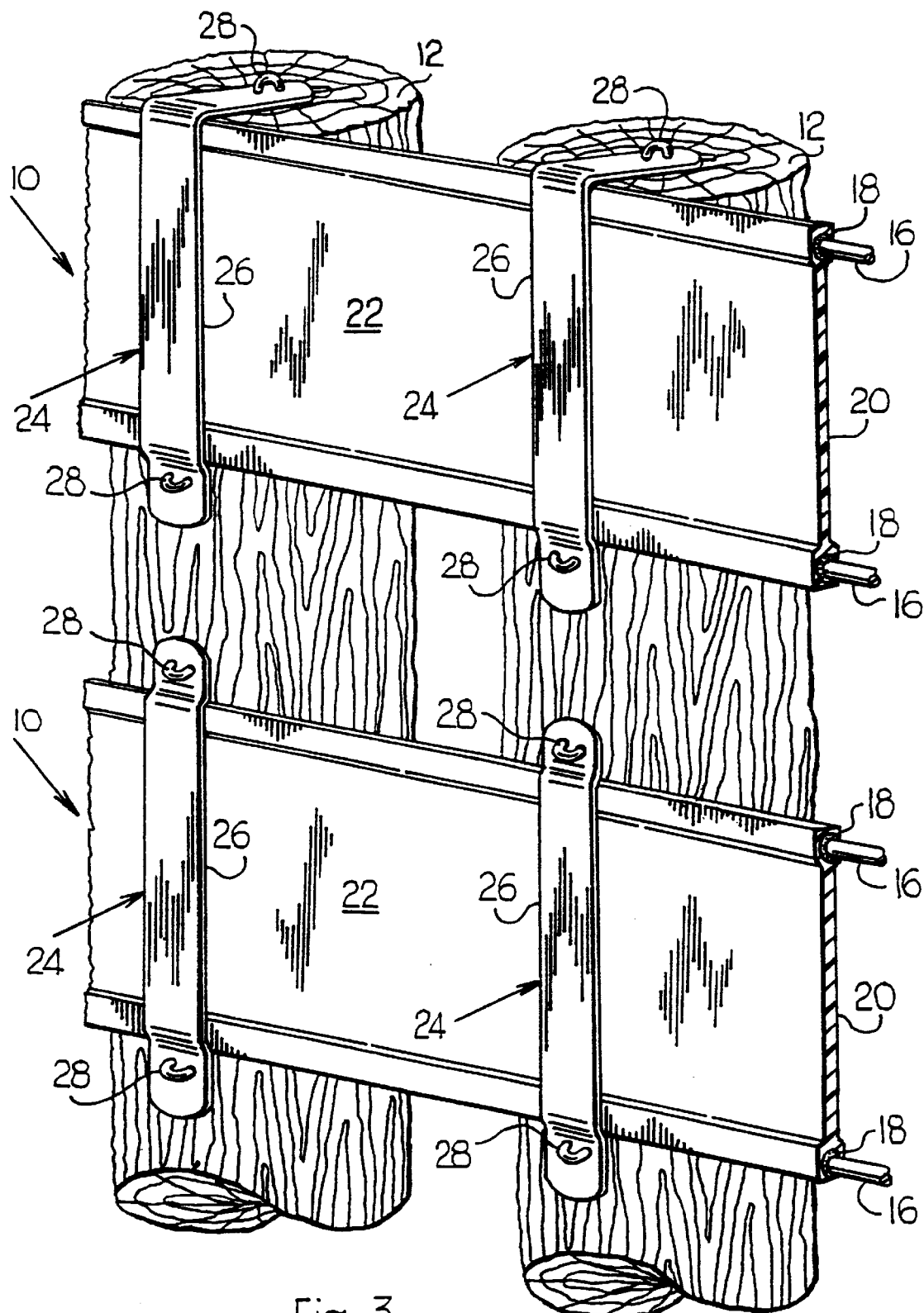
FIG. 3 is a perspective view of the assembly of FIG. 1 showing a plurality of fence posts and a plurality of rail members connected between the fence posts.

FIG. 1 shows a composite metal and plastic fence assembly 10 made in accordance with the present invention. The assembly 10 generally includes a fence post 12 and at least one fence rail member 14 vertically supported on the post 12. In FIG. 1, only one fence post 12 is shown with a single fence rail member 14 attached thereto, but it will be apparent to those skilled in the art that the assembly 10 will include a plurality of fence posts 12 and may have a plurality of rail members 14 extending between and vertically supported on the posts 12, as shown in FIG. 3 discussed hereinafter. The fence post 12 may be made of wood, as shown in FIG. 1, plastic, concrete or metal.

Figure 2:
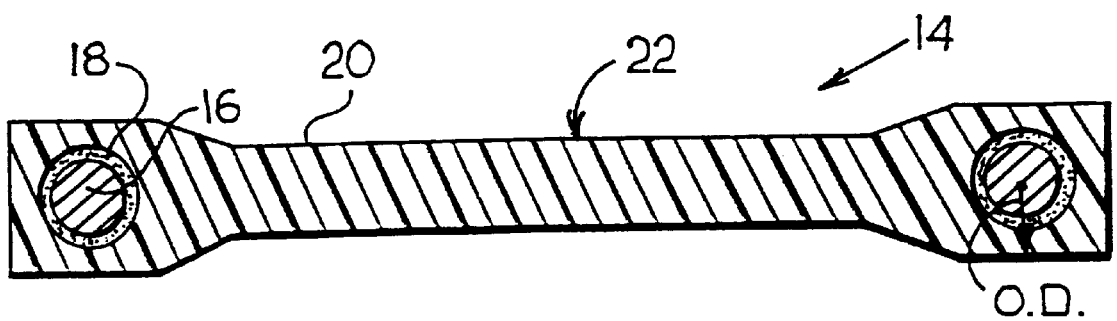
FIG. 2 is a cross-sectional view of the composite metal and plastic fence rail member shown in FIG. 1.

Referring now to FIGS. 1–3, the fence rail member 14 generally includes at least two longitudinally extending wires 16. The wires 16 are preferably 12½ gauge galvanized high tensile strength metal fence wires having a tensile strength of between about 120,000 to 240,000 psi. However, the wires 16 are not limited to 12½ gauge wire and may include 8 gauge to 18 gauge metal fence wire. A plurality of wires 16 in addition to the two wires 16 shown in FIGS. 1 and 2 may be provided in the fence rail member 14, as will be appreciated by those skilled in the art.

The wires 16 are surrounded by an adhesive layer 18 adhered to each of the wires 16. The adhesive layer 18 is preferably extruded in a melted state onto the wires 16 and will have a thickness between about 0.001 and 0.030 of an inch. The adhesive layer 18 may be any adhesive suitable for bonding polyvinyl chloride, polyethylene, polypropylene or a combination of polyethylene and polypropylene with galvanized wire such as a glue manufactured by Dow Chemical, Inc. currently sold under the trademark Primacor® Adhesive Polymer.

The wires 16 are enclosed by a layer of synthetic resin material 20 which is adhered to the wires 16 by the adhesive layers 18. The layer of synthetic resin material 20 encloses the wires 16 and forms a web 22 extending between the wires 16 such that the fence rail member 14 is formed. The adhesive layer 18 surrounding each of the wires 16 overcomes the difficulties discussed previously associated with bonding plastic to metal fence wires. The layer of synthetic resin material 20 is preferably polyvinyl chloride, polyethylene, polypropylene or a combination of polyethylene and polypropylene. The adhesive layers 18 effectively bond the layer of synthetic resin material 20 to the wires 16. The layer of synthetic resin 20 will preferably have a 0.300 inch outside diameter (O.D.) thickness when coated onto a 12½ gauge fence wire and a 0.180 inch outside diameter thickness when coated onto a 16 gauge fence wire.

As shown in FIGS. 1 and 3, the fence rail member 14 is vertically supported on the fence post 12. In particular, as shown in FIG. 3, the fence rail members 14 are vertically supported on the fence posts 12 by a plurality of brackets 24. The brackets 24 are each comprised of an elongated member 26 and a staple 28 adapted to cooperate with the member 26. The member 26 preferably defines a plurality of holes (not shown) for cooperating with the prongs (not shown) of the staple 28. The member 26 may be made of galvanized metal. In FIG. 1, two staples 28 are shown cooperating with a single member 26, with the prongs of the staples 28 embedded in the wooden fence post 12. The fence rail members 14 in FIG. 3 are positioned between the brackets 24 and the respective posts 12. The brackets 24 shown in FIGS. 1 and 3 are merely illustrative of one apparatus for attaching the fence rail member 14 to the fence post 12 and other similar fastening schemes are envisioned by the present invention. For example, the bracket 24 may be replaced by a simple strap which attaches the fence rail member 14 to the fence post 12 with nails, screws or other similar fastening devices.

Figure 4:
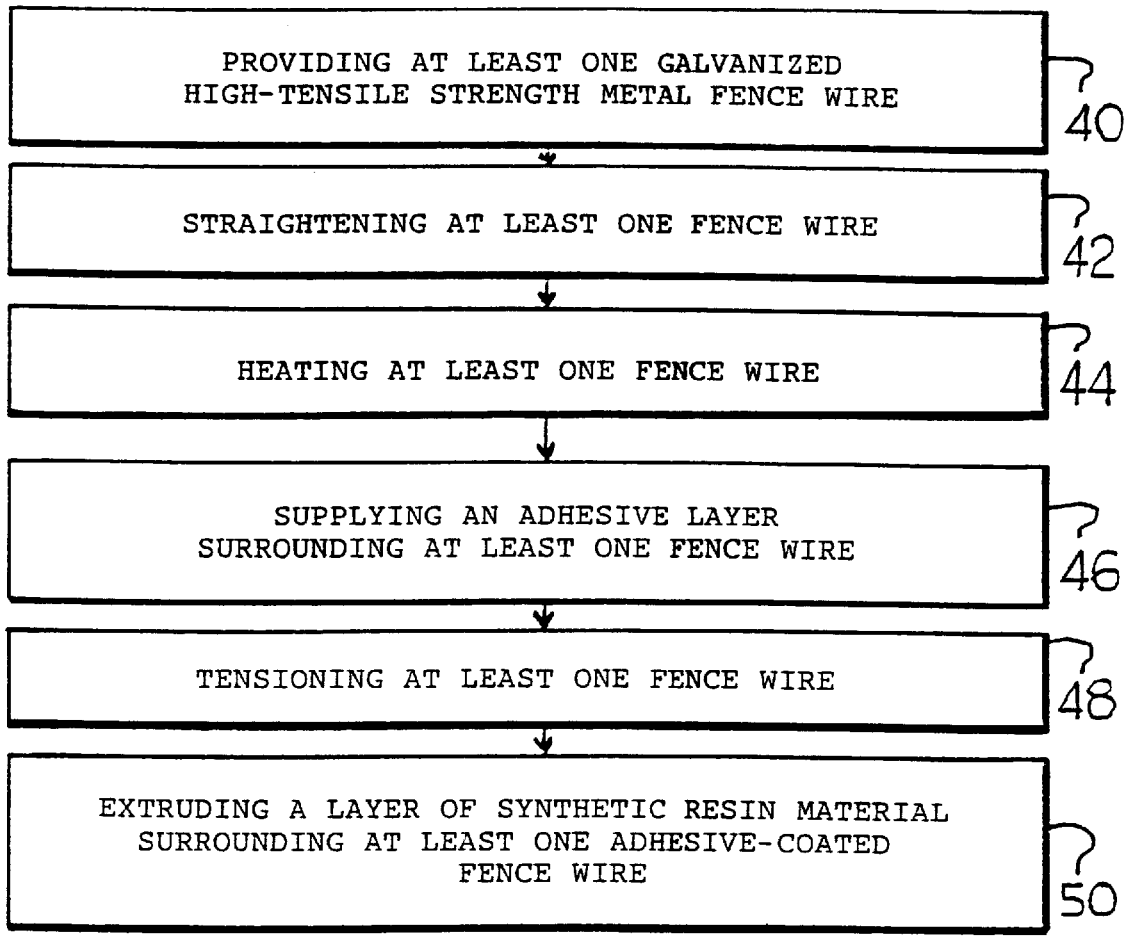
FIG. 4 schematically illustrates a method of making a composite metal and plastic fence rail member according to the present invention.

The present invention also includes a method for forming a composite metal and plastic fence member, such as a fence rail. The method for forming the fence rail member 14 is illustrated schematically in FIG. 4 and generally includes the steps of: providing in step 40 at least one but generally a plurality of galvanized high tensile strength metal fence wires 16; straightening the fence wires 16 at step 42; heating the fence wires 16 at step 44; supplying or extruding a melted adhesive at step 46 onto each of the fence wires 16 to form an adhesive layer 18 surrounding the fence wires 16; tensioning the glue coated fence wires 16 at step 48; and extruding a layer of synthetic resin material 20 surrounding the straightened, glue coated, pretensioned fence wires 16 at step 50. As discussed previously, the wires 16 are preferably 12½ gauge galvanized high tensile strength metal fence wires, but may also be 8–18 gauge fence wires. The wires 16 may also be purchased prestraightened. The heating step of the method preferably heats the wires 16 to approximately 300° F. and can be done with an open flame, by induction or by electric preheater. The melted adhesive is preferably extruded onto the wires 16 to form the adhesive layer 18 which will preferably have a thickness of between about 0.001 and 0.030 of an inch. The layer of synthetic resin material 20 is preferably extruded onto the wire 16 such that the layer of synthetic resin material 20 encloses the wires 16. The synthetic resin material 20 may also form a web 22 extending between the spaced wires 16. The layer of synthetic resin material 20 is bonded to the wires 16 by the adhesive layer 18 surrounding each of the wires 16.

The adhesive layer 18 and the resin material 20 may be extruded separately and sequentially onto the wires 16 using methods and apparatus customary in the art such as a crosshead extruder for encapsulating a single wire or a flat head extruder for encapsulating a plurality of wires for forming substantially flat pieces such as rails. Alternatively, the adhesive layer 18 and the resin material 20 may be co-extruded onto the wires 16 using a co-extruder fitted with a double crosshead, one each for the adhesive layer 16 and the synthetic resin material 20, and by other similar methods known in the art.

The composite metal and plastic fence member made in accordance with the above described method provides, in particular, a fence rail member 14 in which the layer of synthetic resin material 20 is well bonded to the underlying wires 16 so that when two coils of fence rail members 14 are joined together and tensioned during installation, the synthetic resin material 20 will not pull apart or separate from the wires 16 at the joints between adjacent fence rail members 14. The above described method results in a composite metal and plastic fence member having a 100% memory that requires less tension on a fence and reduces the need for excessive end bracing to make the fencing look its best.

The composite metal and plastic fence assembly 10 made in accordance with the present invention provides fencing which overcomes the previously discussed deficiencies in the prior art but which adds minimal additional cost to the manufacture of composite metal and plastic fencing. The composite metal and plastic fence assembly 10 specifically provides fencing in which the layer of synthetic resin material 20 is well bonded to the underlying wires 16 so that water is prevented from entering the wires 16 at their ends. The present invention also prevents potential exposure of the wires 16 through abrasion by livestock or by expansion and contraction of the layer of synthetic resin material 20 relative to the underlying wires 16.

Although this invention has been described with reference to the preferred embodiments, obvious modifications and alterations of the invention may be made without departing from the spirit and scope of the present invention. The scope of the present invention is defined by the appended claims and equivalents thereto.

I claim:

1. A method of forming a composite metal and plastic fence member, comprising:

providing a plurality of fence wires spaced vertically apart from one another;

straightening the fence wires;

heating the fence wires;

extruding an adhesive in a melted state onto each of the fence wires to form an adhesive layer surrounding each of the fence wires after the step of heating the fence wires;

tensioning the fence wires after the step of supplying the melted adhesive onto the fence wires;

extruding a layer of molten synthetic resin material onto the tensioned fence wires such that the layer of synthetic resin material surrounds the tensioned fence wires and forms webs extending between the tensioned fence wires;

solidifying the synthetic resin material; and releasing tension on the tensioned fence wires after the solidification step to form the plastic fence member, wherein the layer of synthetic resin material is bonded to the fence wires by the adhesive layer surrounding each of the fence wires such that when the composite metal and plastic fence member is tensioned during installation the synthetic resin material will not substantially pull apart or separate from the fence wires at the ends of the composite metal and plastic fence member.

2. The method of claim 1, wherein the fence wires are galvanized high tensile strength fence wires.

3. The method of claim 1, wherein the adhesive layer is between 0.001 and 0.030 of an inch in thickness on each of the fence wires.

4. The method of claim 1 wherein the fence wires are heated to approximately 300° F.

* * * * *